United States Patent [19]
Merritt

[11] Patent Number: 5,957,513
[45] Date of Patent: Sep. 28, 1999

[54] CONTAINER LIFTER

[76] Inventor: James A. Merritt, P.O. Box 206, Pleasanton, Calif. 94566

[21] Appl. No.: 09/128,355

[22] Filed: Aug. 3, 1998

[51] Int. Cl.[6] .............................. B65D 23/10; B65G 7/12
[52] U.S. Cl. .............................. 294/15; 294/27.1; 294/92
[58] Field of Search .................................. 294/15, 17, 26, 294/27.1, 28, 31.1, 31.2, 34, 90, 92, 137; 215/396, 397; D9/434, 455

[56] References Cited

U.S. PATENT DOCUMENTS

| | | |
|---|---|---|
| D. 334,888 | 4/1993 | Merritt . |
| D. 340,789 | 10/1993 | Merritt . |
| 2,063,805 | 12/1936 | Goetting .............................. 294/31.2 X |
| 2,372,107 | 3/1945 | Natho ...................................... 294/27.1 |
| 2,406,696 | 8/1946 | Leslie ...................................... 294/27.1 |
| 2,806,731 | 9/1957 | Comstock ............................... 294/27.1 |
| 3,520,570 | 7/1970 | Christopher et al. . |
| 3,963,206 | 6/1976 | Scolaro et al. . |
| 4,273,246 | 6/1981 | Thompson . |
| 4,456,135 | 6/1984 | Beekes ............................... 294/27.1 X |
| 4,565,397 | 1/1986 | Keen .................................. 294/27.1 X |
| 4,753,474 | 6/1988 | Radford . |
| 4,856,834 | 8/1989 | Lancaster et al. ..................... 294/92 X |
| 4,936,614 | 6/1990 | Russell .................................. 294/27.1 |
| 5,085,477 | 2/1992 | Gagnon .................................. 294/31.1 |

FOREIGN PATENT DOCUMENTS

| | | |
|---|---|---|
| 707856 | 6/1980 | U.S.S.R. . |
| 83/02101 | 6/1983 | WIPO . |

OTHER PUBLICATIONS

"The All New Bottle Cady II® Back–Saving Water Bottle Carrier", Advertising Brochure/Order Form, M&B Manufacturing, Pleasanton, CA 94588, no date.

*Primary Examiner*—Johnny D. Cherry
*Attorney, Agent, or Firm*—Townsend and Townsend and Crew LLP

[57] ABSTRACT

A container lifter (2), suited for lifting and moving 5-gallon water bottles (4) by the neck (6), includes a U-shaped collar (14) with proximal and distal portions (16, 18), a side brace (28) extending from the distal portion of the collar and a handle (34) extending from the proximal portion of the collar. A horizontally-oriented container can be removed from a delivery truck and placed in a generally vertical orientation. To do so, the collar is slid sideways onto the neck of the bottle, the handle is pulled horizontally so the collar engages the neck ring, and the bottle is pulled from the truck. Once free from the truck, the bottle swings down to a generally, but not completely, vertical orientation at which the proximal portion of the collar and the side brace engage the neck. The container lifter can also be used to lift and move generally vertically-oriented bottles with the proximal portion of the collar and the side brace engaging the neck.

21 Claims, 4 Drawing Sheets

CONTAINER LIFTER

BACKGROUND OF THE INVENTION

The present invention is directed to a container lifter, in particular a container lifter specially suited for lifting large water bottles and removing water bottles from support structures.

Many containers having necks, but no handles, are difficult to lift or remove from a support structure and to carry. This is especially true for large water bottles, such as the 5-gallon variety delivered to home and office. Due to the weight and awkward size of such bottles, many people experience difficulty moving them. Many lack the strength or grip for handling such bottles. People often resort to pushing or rolling such bottles in order to move them from place to place.

A more pronounced problem is created during the delivery of such bottles. Typically, the containers are delivered to homes and offices by delivery truck. These trucks have a support structure for the containers that places them horizontally. This horizontal position facilitates movement and storage of the containers while on the delivery truck. However, it is often difficult and awkward to remove the containers from the support structures and then move them to their respective destinations.

Devices to lift and carry such containers are in use. These devices are designed to fit around the neck of the container. Upon lifting the handle of these devices, the device engages the neck of the container and allows the container to be moved more easily. Unfortunetly, when using these devices to remove containers from their horizontal positions on the delivery truck or other support structure, the device may apply enough force to the cap of the container to cause the cap to be inadvertently removed during handling.

SUMMARY OF THE INVENTION

A container lifter made according to the invention permits the user to easily, comfortably and safely lift and carry large containers, typically 5-gallon water bottles, in a generally vertical, upright orientation. The container lifter also permits the user to easily, comfortably and safely remove large water bottles from their usually horizontally mounted positions on a delivery truck.

According to the present invention, a container lifter is provided for lifting a container of a type having a neck with two lateral dimensions. The neck of the container has a main portion, with a first lateral dimension, and an enlarged region, the enlarged region having a second, larger lateral dimension. The container lifter has a collar that includes a proximal portion and a distal portion. The proximal and distal portions have spaced-apart, proximal and distal surfaces positionable opposite first and second neck positions on opposite sides of the neck. In addition, the container lifter has a side brace typically extending from the distal portion of the collar. The side brace has a bracing surface engagable with the neck at a third position on the neck. The container lifter also has a handle extending from the proximal portion of the collar.

The present invention also advantageously provides a method for moving a generally horizontally oriented container from a support structure to an upright, generally vertical orientation. This method includes first selecting a container lifter comprising a collar, and a side brace and handle extending from the collar; positioning the collar around the neck of the container; and removing the container from the support structure by pulling the handle generally horizontally so the collar engages an enlarged portion on opposite sides of the container neck. This causes the container to be pulled generally horizontally from a first position, supported by the support structure, toward a second position, unsupported by the support structure; at this time the container moves to a third position at which the container is at a generally, but not completely, vertical orientation. The container is now supported by the container lifter with the opposite sides of the neck engaged by the collar and side brace.

The present invention provides a simple device for lifting containers requiring minimal outlay of capital for its production. The container lifter can be inexpensive to manufacture as it can be made as a one-piece structure with no moving parts. It may be made in a variety of ways, such as from one piece of bent metal, made as a metal casting or made as a molded plastic part. The use of aluminum creates a lightweight, yet sturdy device. Cushioning elements, such as a handle grip mounted to the handle and a cushioning layer on the side brace, can also be used for comfort and safety. The invention could also be made from separate elements secured together, such as by welding.

Other features and advantages of the invention will appear from the following description in which the preferred embodiments have been set forth in detail in conjunction with the accompanying drawings.

DESCRIPTION OF THE PREFERRED EMBODIMENT

Figure 1:
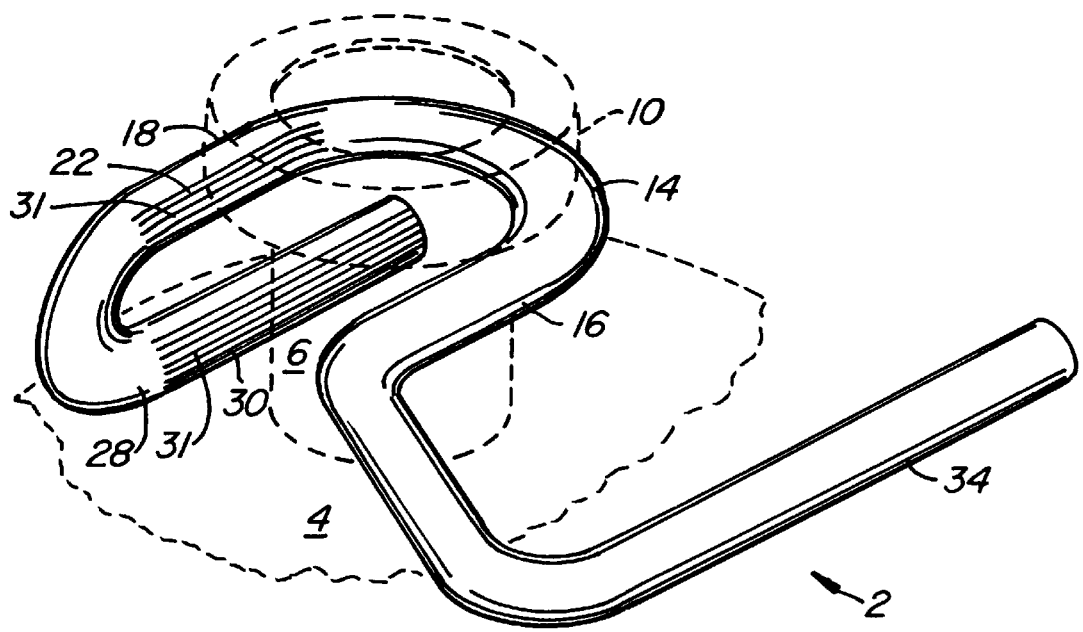
FIG. 1 is a perspective view of a container lifter made according to the invention with the top of a container shown in dashed lines.
Figure 2:
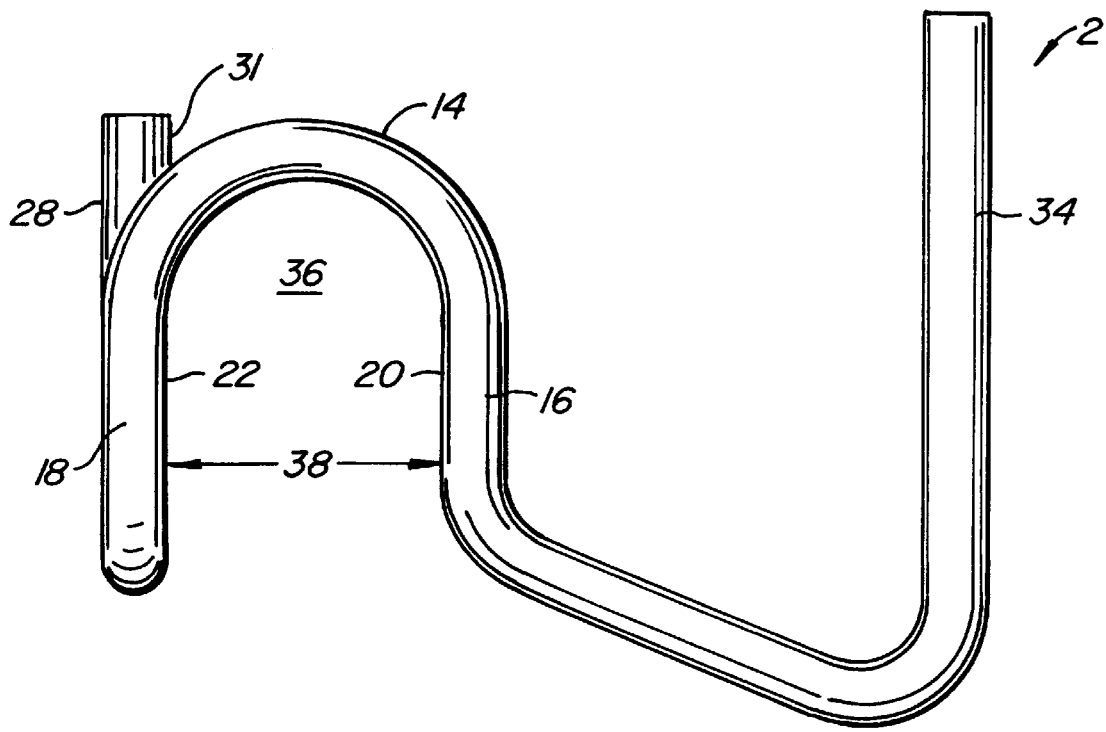
FIG. 2 is a top plan view of the the container lifter of FIG. 1 showing the U-shaped collar section and the handle.
Figure 3:
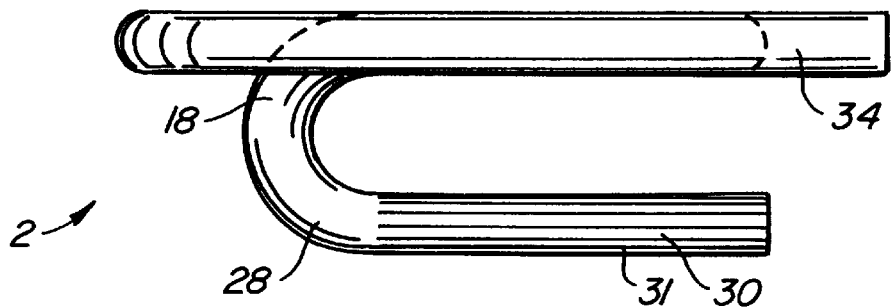
FIG. 3 is a right side elevational view of the container lifter of FIG. 2 showing the side brace.

Referring now to FIGS. 1–5, a container lifter 2 is shown that includes a U-shaped collar 14, a side brace 28 and a handle 34 made from one continuous piece of bent aluminum. Container lifter 2 is used for lifting and moving a container 4 of a type having a neck 6 defining a first lateral dimension 8. Neck 6 also includes an enlarged region 10 having a second lateral dimension 12, the second lateral dimension being longer than the first lateral dimension.

Collar 14 includes a proximal portion 16 and a distal portion 18, the proximal and distal portions having spaced-apart, proximal and distal surfaces, 20 and 22 respectively, positionable opposite first and second neck positions, 24 and 26 respectively, on opposite sides of the neck of the container.

The side brace 28 extends from distal portion 18 of collar 14. Side brace 28 includes a bracing surface 30 engagable with neck 6 at a third position 32 on neck 6. Handle 34 extends from proximal portion 16 of the collar 14.

Collar 14 has a central open region or neck receiving space 36 sized to fit around neck 6 of the container 4. Container 4 is a conventional 5-gallon water bottle used to hold drinking water. Central open region 36 has opposed surfaces 20 and 22 for gripping the neck 6 of container 4.

Figure 4:
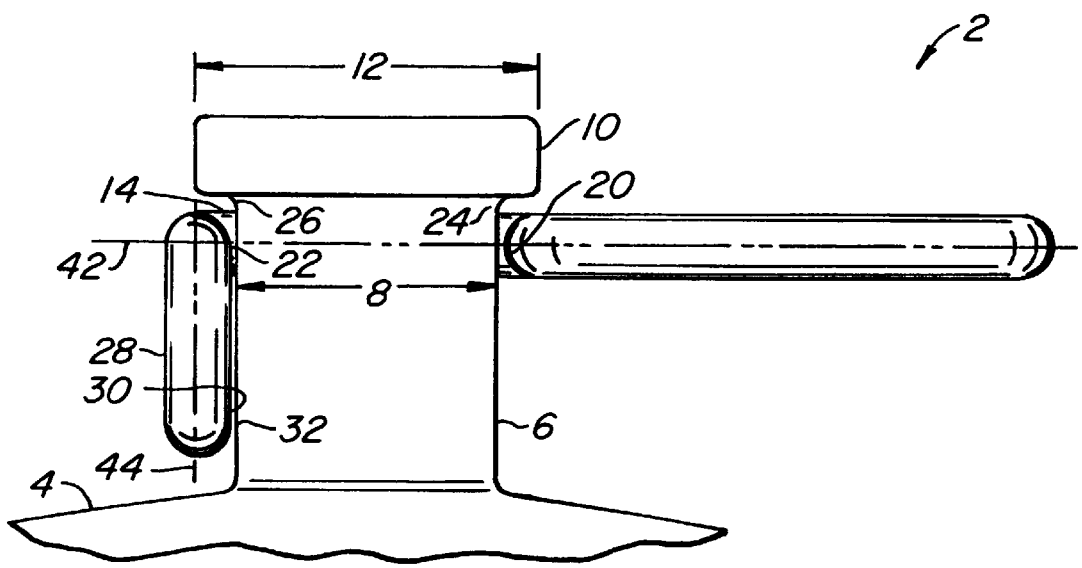
FIG. 4 is a front elevational view of the container lifter of FIG. 1 mounted to the neck of a container.
Figure 4A:
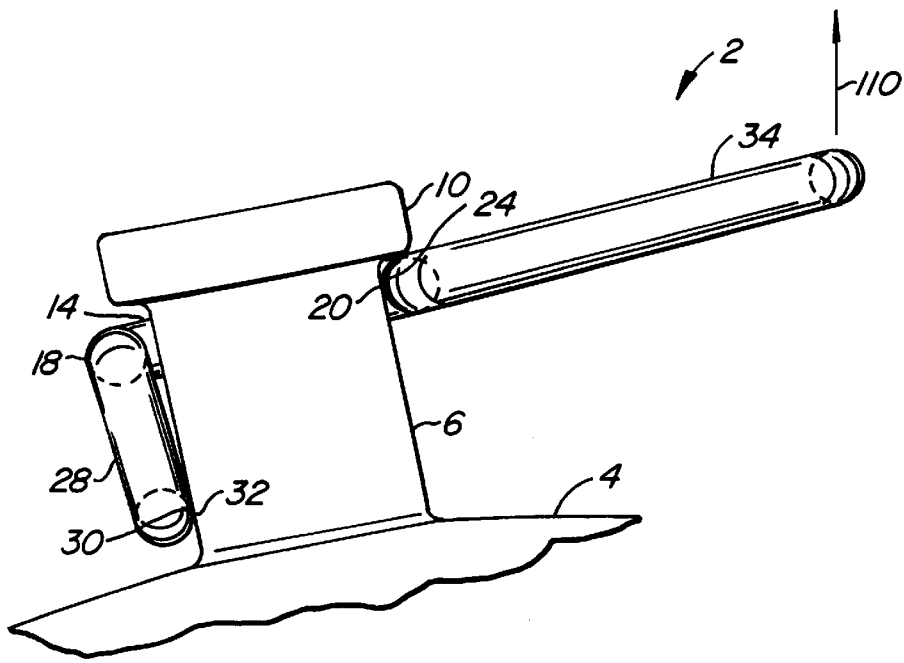
FIG. 4A is a front elevational view of the container lifter of FIG. 1, the handle of the container lifter having been lifted so that the proximal portion of the collar and the bracing surface engage the neck of the container.

In use, container lifter 2 can be used to lift and carry container 4 to any desired location. Collar 14 is placed around neck 6 of a vertically-oriented container 4 by passing an open end or laterally directed mouth 38 of U-shaped collar 14 laterally over the main portion of neck 6 and into the neck receiving space 36. Proximal surface 20, distal surface 22 and bracing surface 30 are positioned around neck 6 at positions opposite first neck position 24, second neck position 26 and third neck position 32, as seen in FIG. 4. As handle 2 is raised to lift container 4, as indicated by arrow 110 in FIG. 4A of the drawings, proximal surface 20 engages the enlarged region 10 and first neck position 24 and bracing surface 30 engages third neck position 32. See FIG. 4A. Container 4 may then be lifted and moved to any desired location by container lifter 2.

Figure 5:
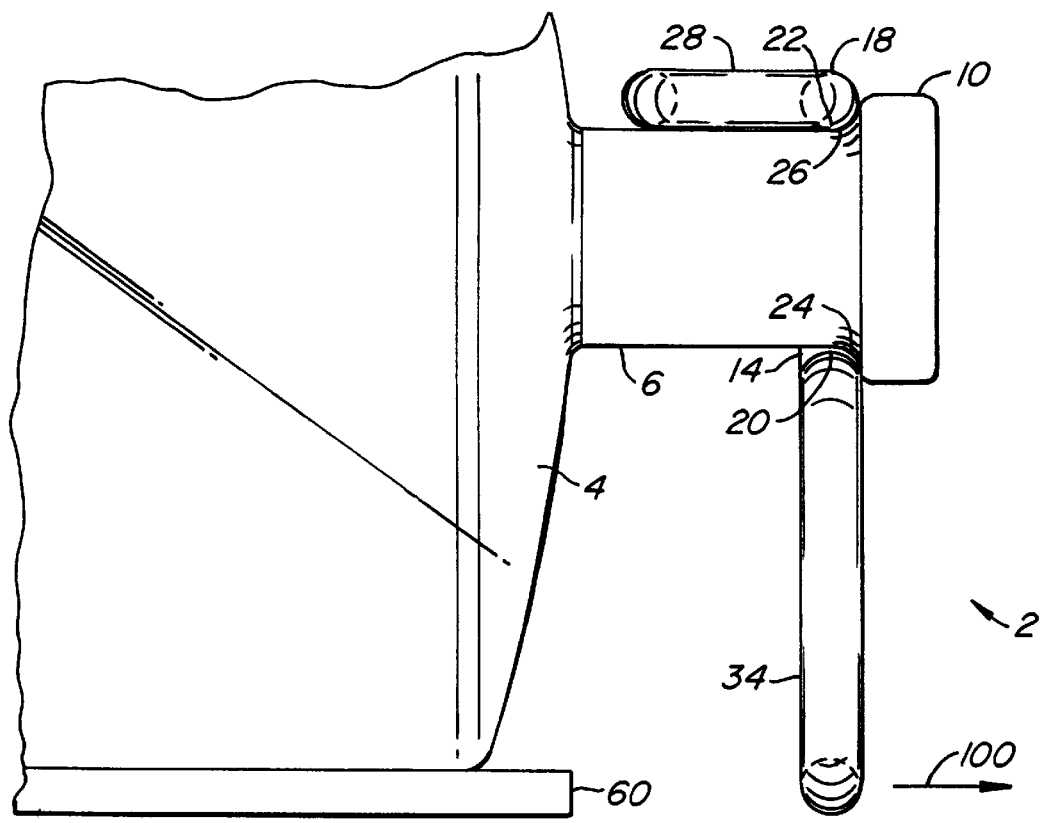
FIG. 5 is a front elevational view of the container lifter and container of FIG. 4 with the container being supported generally horizontally on a support structure.

Container 4 is often transported on a delivery truck or other support structure 60 in a generally horizontal position. The containers lie on their sides with necks 6 pointed toward the delivery person. Collar 14 is placed around neck 6 by moving the open end of U-shaped collar 14 laterally onto neck 6. FIG. 5 shows handle 34 below the collar; handle 34 could be positioned at other rotary orientations if desired. Proximal surface 20 and distal surface 22 are positioned around neck 6 and opposite first neck position 24 and second neck position 26. To remove container 4 from the support structure 60, handle 6 is pulled in the direction of arrow 100. This causes proximal surface 20 and distal surfaces 22 to engage the enlarged region 10 of neck 6 adjacent first neck position 24 and second neck position 26 as seen in FIG. 5. Handle 34 is continued to be pulled to move container 4 off of support structure 60 in a substantially lateral direction, as indicated by arrow 100. Once container 2 is no longer supported by support structure 60, the bottom of the container will swing downwardly and the container will be supported in the generally vertical orientation of FIG. 4A with proximal surface 20 engaging enlarged region 10 of neck 6 and bracing surface 30 engaging third neck position 32.

Figure 6:
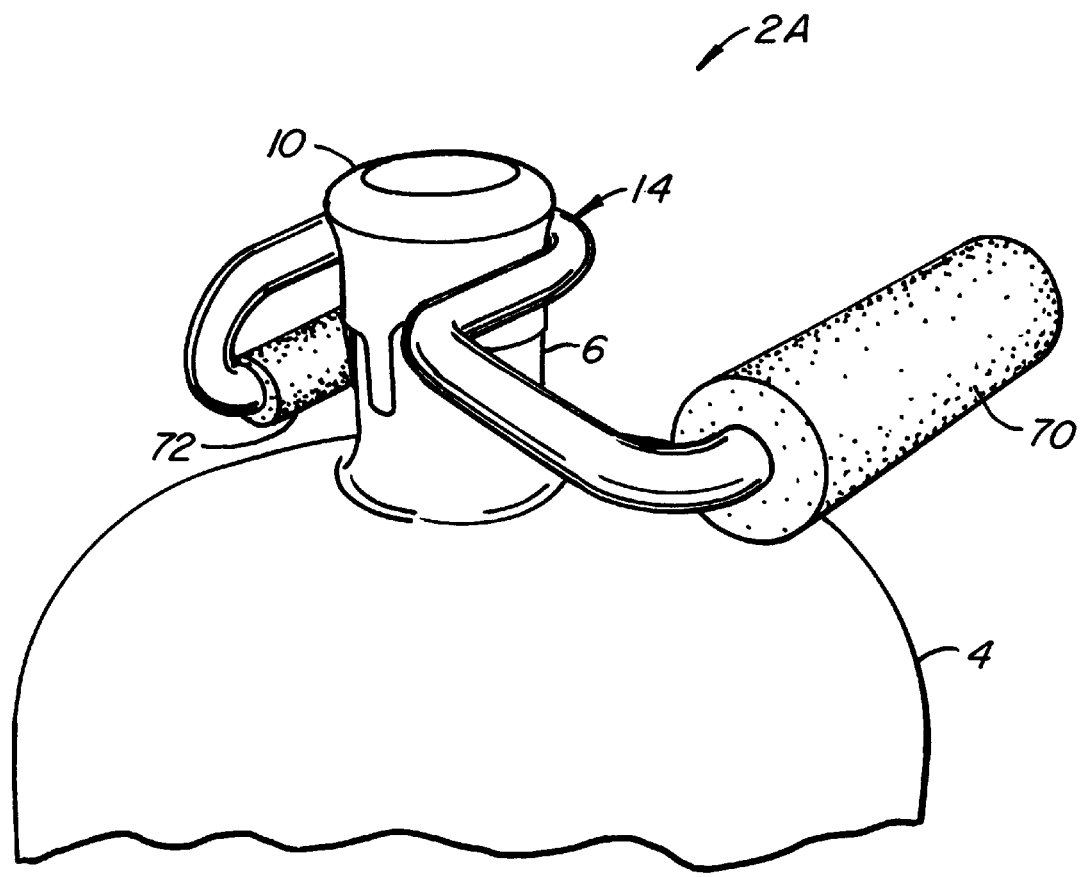
FIG. 6 is a view similar to FIG. 1 of a preferred embodiment of the invention including cushioning elements on the handle and the side brace.

Container lifter 2 has a U-shaped collar 14 having a distance between the spaced-apart, proximal and distal surfaces, 20 and 22 respectively, greater than first lateral dimension 8 of the neck where contact is made. However, the proximal and distal surfaces, 20 and 22 respectively, and side brace 28 of container lifter 2 could be sized to conform to the surfaces of the neck with which they engage. This would help reduce surface pressure on the neck by distributing the force over a larger area. In addition, proximal and distal surfaces, 20 and 22 respectively, could be covered with high friction elastomeric material both to increase friction and to cushion the engagement. One way to do so is to dip collar 14 and side brace 28 into a suitable coating material, such as the type used in covering tool handles. Another, preferred, way to do so is illustrated in FIG. 6. Handle 2A is similar to handle 2 but also includes a cushioned handle grip 70 mounted over handle 34 and a cushioned sleeve 72 mounted over bracing surface 30 of side brace 28. Handle 2A provides a larger-diameter gripping surface for the user to grasp which increases user comfort, lessens fatigue and reduces any tendency for the user's hand to slip off the handle. Sleeve 72 not only increases the friction between side brace 28 and neck 6, but also helps to reduce stress concentrations by conforming to the curved surface of the neck. The use of sleeve 72 may be particularly useful when container 4 is made of glass.

The preferred embodiment is made from a single bent piece of aluminum, with handle grip 70 and sleeve 72 mounted thereto as shown in FIG. 6. Preferably, as can best be seen with reference to FIG. 4, the proximal and distal surfaces 20, 22 lie in a plane 42, and the distal and bracing surfaces 22, 30 lie in a second plane 44 angled relative to the plane 42. The planes 42, 44 are typically perpendicular to each other. However, casting and welding are other methods for producing the container lifter. The container lifter could also be molded from a suitable structural polymer.

Although the preferred embodiment has a U-shaped collar, and an L-shaped handle and side brace, alternative embodiments may have other-shaped collar, handle and side brace. Also, side brace 28 could extend from proximal portion 16 of collar 14 or from handle 34 instead of distal portion 18 of the collar.

The present invention is especially useful for lifting conventional 5-gallon plastic water bottles. However, the invention could be used to lift other containers having upwardly extending necks.

Container lifter 2 is designed for use with containers having enlarged region 10 having a second lateral dimension 12. Container lifter 2 could be used with containers having necks without such surfaces by increasing the gripping force exerted by proximal and distal surfaces 20 and 22, respectively, and bracing surface 30. This is preferably achieved by the use of a roughened surface, e.g., laterally extending grooves 31 extending along the proximal and the distal surfaces 20 and 22, and the bracing surface 30, respectively, or through the use of conforming, high friction surfaces.

Other modifications and variations can be made to the disclosed embodiments without departing from the subject of the invention as defined in the following claims.

What is claimed is:

1. A container lifter, for lifting a container of a type having a neck defining a first lateral dimension, the neck including an enlarged region having a second lateral dimension, the second lateral dimension being longer than the first lateral dimension, the lifter comprising:

a collar including a proximal portion and a distal portion defining a neck receiving space therebetween in which space the neck of the container is snugly receivable and a mouth directed laterally relative to the neck receiving space and through which the neck can be passed into the neck receiving space, the proximal and distal portions having spaced-apart, proximal and distal surfaces between which the neck receiving space extends, the proximal and distal surfaces being positioned opposite first and second neck positions on opposite sides of the neck of the container when the neck is received in the space;

a side brace extending from the distal portion of the collar, the side brace having a bracing surface positioned operatively below the distal surface so as to be engageable with the neck at a third position on the neck operatively below the second neck position; and a handle extending from the proximal portion of the collar, the handle being positioned relative to the collar such that when the neck is received in the neck receiving space and the handle is raised, the neck is caused to be engaged laterally between the proximal surface and the bracing surface so as to be lifted in sympathy with raising the handle.

2. The container lifter of claim 1 wherein the distal surface and the bracing surface are parallel with one another.

3. The container lifter of claim 1 wherein the proximal and distal surfaces are spaced apart by a distance that is greater than the first lateral dimension but less than the second lateral dimension of the neck of the container.

4. The container lifter of claim 1 wherein the collar, the side brace and the handle constitute a rigid, one-piece structure.

5. The container lifter of claim 1 wherein the collar, the side brace and the handle constitute a single bent piece of metal.

6. The container lifter of claim 1 wherein the collar is generally U-shaped, the proximal and distal portions being defined by opposed limbs of the U-shaped collar, the side brace lying below the distal portion.

7. The container lifter of claim 1 wherein the side brace is generally J-shaped.

8. The container lifter of claim 1 wherein the proximal and distal surfaces lie in a first plane and the distal and bracing surfaces lie in a second plane angled relative to the first plane.

9. The container lifter of claim 8 wherein the first and second planes are generally perpendicular.

10. The container lifter of claim 8 wherein said handle lies in the first plane.

11. The container lifter of claim 1 wherein the collar is made of a rigid material.

12. The container lifter of claim 1 wherein the proximal and distal surfaces and the bracing surface include laterally extending grooves.

13. The container lifter of claim 1 wherein the proximal and distal surfaces are straight surfaces.

14. The container lifter of claim 1 wherein the handle is generally L-shaped.

15. The container lifter of claim 1 wherein the bracing surface comprises a resilient bracing surface.

16. A method of lifting a container of a type having a neck with a first lateral dimension, the neck having an enlarged region with a second lateral dimension, said second lateral dimension being longer than the first lateral dimension, the method comprising the steps of:

selecting a container lifter comprising a collar including a proximal portion and a distal portion defining a neck receiving space therebetween in which space the neck of the container is snugly receivable and a mouth directed laterally relative to the neck receiving space and through which the neck can be passed into the neck receiving space, the proximal and distal portions having proximal and distal surfaces spaced apart by a distance, the distance being shorter than the second lateral dimension and greater than the first lateral dimension, a side brace extending from the distal portion, the side brace having a bracing surface operatively below the distal surface, and a handle extending from the proximal portion of the collar;

positioning the bracing and distal surfaces on one side of the neck and the proximal surface on an opposite side of the neck by passing the mouth of the container lifter laterally over the neck of the container; and raising the handle of the container lifter thereby causing the neck to be engaged by and laterally between the proximal surface and the bracing surface, thereby causing the container to be lifted in sympathy with raising the handle.

17. The method according to claim 16 wherein the selecting step includes the step of choosing a container lifter with a U-shaped collar.

18. The method according to claim 16 further comprising the step of transporting the lifted container from a first location to a second location.

19. A method for moving a generally horizontally oriented container from a support structure to an upright, generally vertical orientation, the container being of a type having a neck with a lateral dimension, the neck having an enlarged portion with a second lateral dimension, said second lateral dimension being longer than the first lateral dimension, the method comprising the steps of:

selecting a container lifter comprising a collar including a proximal portion and a distal portion defining a neck receiving space therebetween in which space the neck of the container is snugly receivable and a mouth directed laterally relative to the neck receiving space and through which the neck can be passed into the neck receiving space, the proximal and distal portions having proximal and distal surfaces spaced apart by a distance, the distance being shorter than the second lateral dimension and greater than the first lateral dimension, a side brace extending from the distal portion, the side brace having a bracing surface operatively below the distal surface, and a handle extending from the proximal portion of the collar;

positioning the proximal and distal surfaces on opposite sides of the neck by passing the mouth of the container lifter laterally over the neck of the container;

pulling the handle generally horizontally thereby to cause the proximal and distal surfaces to engage the enlarged portion so as to pull the container generally horizontally from the support structure to a position clear of the support structure; and permitting the container to drop from its generally horizontal orientation to the generally vertical orientation while opposite sides of the neck are engaged laterally between the proximal surface and the bracing surface.

20. The method according to claim 19 wherein the selecting step includes the step of choosing a container lifter with a U-shaped collar.

21. The method according to claim 19 further comprising the step of carrying the generally vertically oriented container to a require remote location.

* * * * *